United States Patent
Zając et al.

(10) Patent No.: US 11,339,886 B2
(45) Date of Patent: May 24, 2022

(54) VALVE ACTUATION MECHANISM

(71) Applicant: Goodrich Corporation, Charlotte, CT (US)

(72) Inventors: Piotr Zając, Wroclaw (PL); Kamil Czechowski, Wroclaw (PL)

(73) Assignee: GOODRICH CORPORATION, Charlotte, NC (US)

( * ) Notice: Subject to any disclaimer, the term of this patent is extended or adjusted under 35 U.S.C. 154(b) by 235 days.

(21) Appl. No.: 16/560,012

(22) Filed: Sep. 4, 2019

(65) Prior Publication Data

US 2020/0096126 A1 Mar. 26, 2020

(30) Foreign Application Priority Data

Sep. 21, 2018 (EP) .................................... 18461609

(51) Int. Cl.
| | | |
|---|---|---|
| *F16K 31/52* | (2006.01) | |
| *F16K 17/04* | (2006.01) | |
| *F16K 1/28* | (2006.01) | |
| *F16K 1/50* | (2006.01) | |

(Continued)

(52) U.S. Cl.
CPC .............. *F16K 17/042* (2013.01); *F16K 1/28* (2013.01); *F16K 1/50* (2013.01); *F16K 31/528* (2013.01); *F16K 35/06* (2013.01)

(58) Field of Classification Search
CPC . F16K 17/042; F16K 1/28; F16K 1/50; F16K 5/0652; F16K 5/061; F16K 5/0647; F16K 31/528; F16K 31/5282; F16K 31/563; A62C 13/64
See application file for complete search history.

(56) References Cited

U.S. PATENT DOCUMENTS

| | | |
|---|---|---|
| 1,546,637 A | 7/1925 | Ernst |
| 1,840,959 A | 1/1932 | Kraft |
| 3,145,441 A | 8/1964 | Strandrud |

(Continued)

FOREIGN PATENT DOCUMENTS

| | | |
|---|---|---|
| CN | 204610895 U | 9/2015 |
| DE | 202004009547 U1 | 9/2004 |

(Continued)

OTHER PUBLICATIONS

Extended European Search Report for International Application No. 18461609.2 dated Feb. 21, 2009, 11 pages.

*Primary Examiner* — Kelsey E Cary
(74) *Attorney, Agent, or Firm* — Cantor Colburn LLP

(57) ABSTRACT

A valve actuation mechanism comprises a housing, an actuation pin rotatably mounted within the housing and at least one torque spring coupling the actuation pin to the housing for biasing the actuation pin from a first, inoperative rotational position towards a second, operative rotational position. The mechanism further comprises an actuation pin retaining element for selectively retaining the actuation pin in its first position, the retaining element being engageable with the actuation pin and the housing when the retaining element is in a retaining position so as to prevent rotation of the actuation pin towards its second position, and selectively disengageable from the housing to permit rotation of the actuation pin towards its second position. A locking element is provided for selectively preventing disengagement of the retaining element from the housing.

20 Claims, 18 Drawing Sheets

(51) Int. Cl.
*F16K 31/528* (2006.01)
*F16K 35/06* (2006.01)

(56) References Cited

U.S. PATENT DOCUMENTS

| | | | |
|---|---|---|---|
| 4,020,904 A | | 5/1977 | Depalma |
| 4,779,840 A | * | 10/1988 | Andrea ................. F16K 5/0642 |
| | | | 251/174 |
| 5,771,742 A | | 6/1998 | Bokaie et al. |
| 6,533,243 B1 | * | 3/2003 | Sumner ................. F16K 31/563 |
| | | | 251/303 |
| 2017/0284310 A1 | * | 10/2017 | Delplanque ............. F02D 9/107 |
| 2019/0170092 A1 | * | 6/2019 | Oblinger ................... F02D 9/04 |

FOREIGN PATENT DOCUMENTS

| | | |
|---|---|---|
| DE | 202006016132 U1 | 12/2006 |
| EP | 2644924 A1 | 10/2013 |
| EP | 3184437 A1 | 6/2017 |
| GB | 283850 A | 3/1928 |
| GB | 976852 A | 12/1964 |
| WO | 9222766 A1 | 12/1992 |

\* cited by examiner

VALVE ACTUATION MECHANISM

FOREIGN PRIORITY

This application claims priority to European Patent Application No. 18461609.2 filed Sep. 21, 2018 the entire contents of which is incorporated herein by reference.

TECHNICAL FIELD

The present invention relates to a valve actuation mechanism and a method of assembling a valve actuation mechanism.

BACKGROUND

A variety of mechanisms are actuated by rotating a pin. Some valves, such as ball valves, can be actuated by rotating a pin to open and/or close the valve. In high pressure evacuation systems, high pressure valves with locking pins are widely used. To open the valve, the locking pin must be removed from the actuation mechanism. The locking pin could subsequently be lost, meaning that the valve cannot be locked again in its closed position.

SUMMARY

From a first aspect, the disclosure provides a valve actuation mechanism comprising a housing, an actuation pin rotatably mounted within the housing and at least one torque spring coupling the actuation pin to the housing for biasing the actuation pin from a first, inoperative rotational position towards a second, operative rotational position. An actuation pin retaining element selectively retains the actuation pin in its first position, the retaining element being engageable with the actuation pin and the housing when the retaining element is in a retaining position so as to prevent rotation of the actuation pin towards its second position, and selectively disengageable from the housing to permit rotation of the actuation pin (6) towards its second position. A locking element selectively prevents disengagement of the retaining element from the housing.

The housing may comprise a key formation for receiving a corresponding key formation on the retaining element when the retaining element is in its retaining position.

The locking element may comprise a key formation selectively alignable with the housing key formation and the retaining element key formation to permit the retaining element to disengage from the housing.

The housing and locking element key formations may each comprise at least one slot.

The locking element key formation may comprise an opening through which the retaining element can pass when the locking element and retaining element key formations are aligned.

The locking element may comprise a securing element configured to retain the locking element in at least one of a locked position and a release position, in which the release position allows the retaining element to disengage from the housing.

The securing element may comprise a resilient member deformable to allow the locking element to rotate between the locked position and the release position.

The securing element may comprise at least one resilient arm which engages a detent in the housing to retain it in at least one of the locked and release positions.

The securing element may be received within a groove formed within a peripheral wall of the locking element. The groove may optionally comprise openings to allow engagement of a or the resilient arm of the securing element with a or the detent in the housing.

The actuation pin may comprise a slot to accommodate a first end of the torque spring.

The housing may comprise a slot to accommodate a second end of the torque spring.

The retaining element may comprise a further key formation for receiving an end of the actuation pin when the retaining element is in its retaining position The disclosure also provides a valve comprising the valve actuation mechanism in accordance with the disclosure, the first position of the actuation pin corresponding to a closed state of the valve and the second position of the actuation pin corresponding to an open state of the valve.

The disclosure also provides a method of assembling an actuation mechanism for a valve, the method comprising coupling a torque spring to an actuation pin by inserting a first end of the torque spring into a slot in the actuation pin and mounting the actuation pin and torque spring within a housing. A second end of the torque spring extends into a slot within the wall of the housing. A locking element is coupled to the housing. A retaining element is engaged with the actuation pin and rotated so that the actuation pin rotates to load the torque spring. The retaining element is engaged with the housing so that the housing prevents the retaining element and actuation pin from rotating under the load of the torque spring. The locking element is locked to prevent disengagement of the retaining element from the actuation pin and the housing.

Locking the locking element may comprise moving a key formation of the locking element out of alignment with a corresponding key formation of the retaining element.

BRIEF DESCRIPTION OF DRAWINGS

An embodiment of a valve actuation mechanism in accordance with the disclosure will now be described by way of example only with reference to the accompanying drawings in which.

DETAILED DESCRIPTION

Figure 1A:
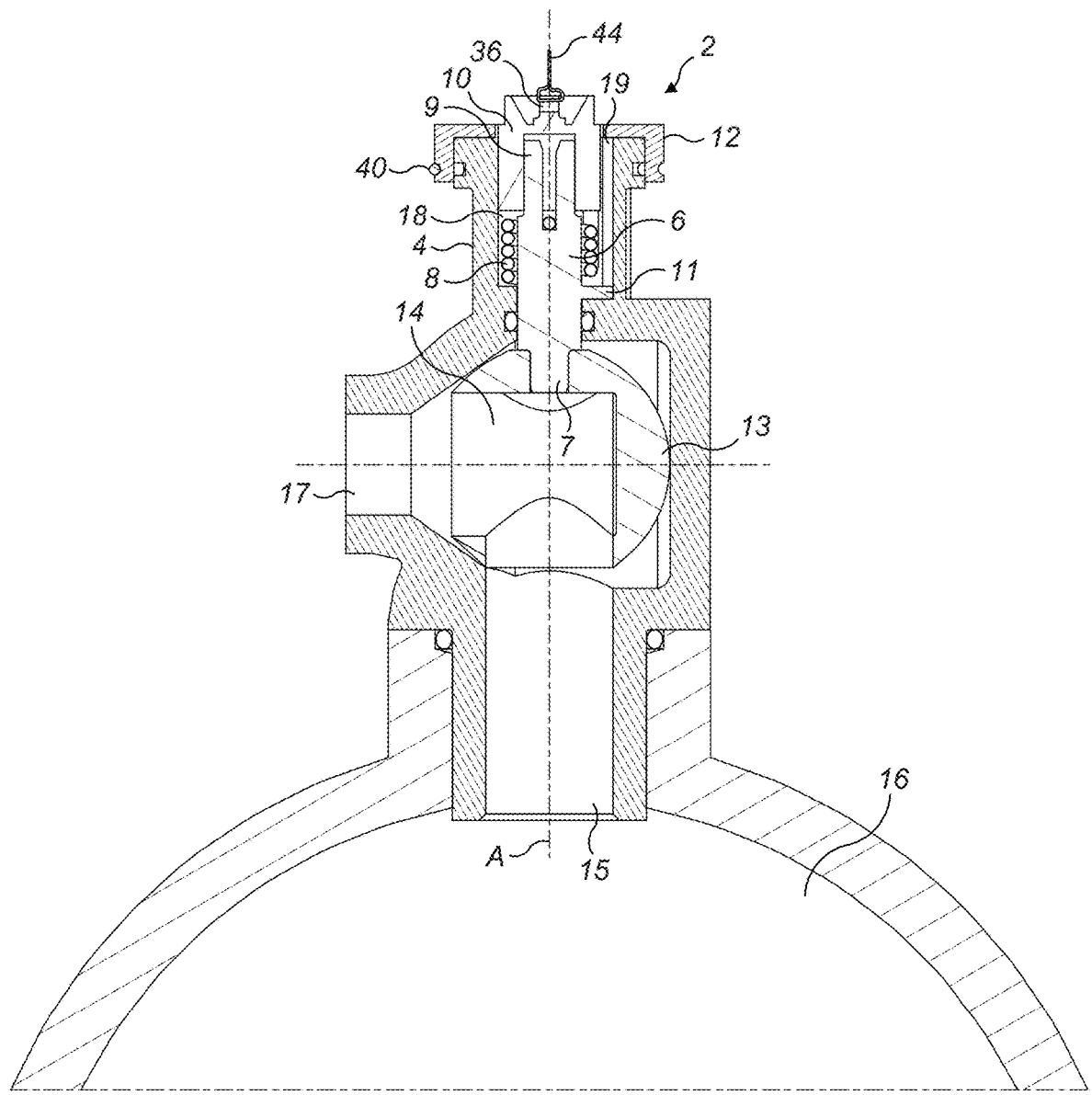
FIG. 1A shows a cross-sectional view of a valve actuation mechanism in a non-actuating configuration.
Figure 1B:
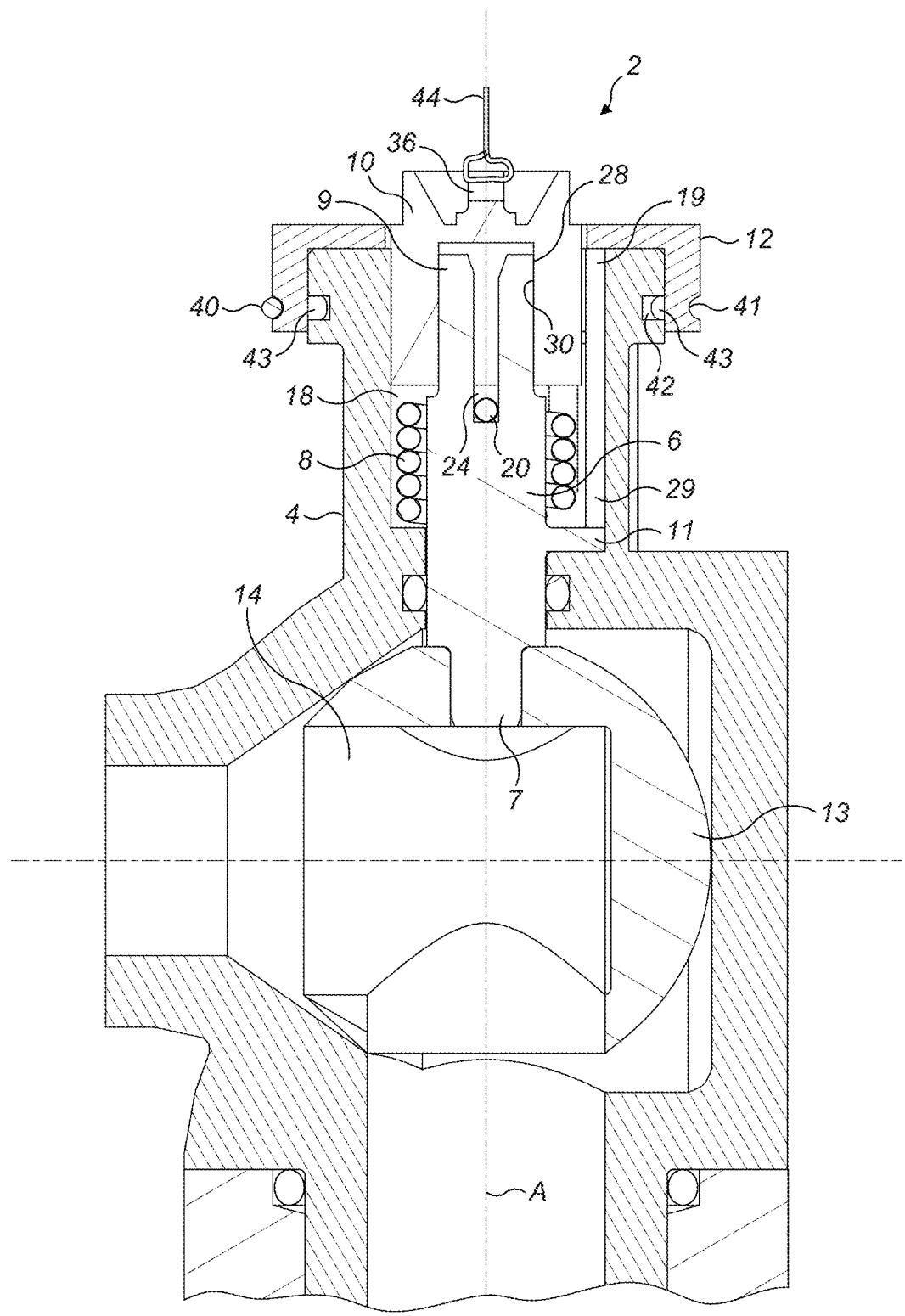
FIG. 1B shows a closer cross-sectional view of the valve actuation mechanism of FIG. 1A.
Figure 2:
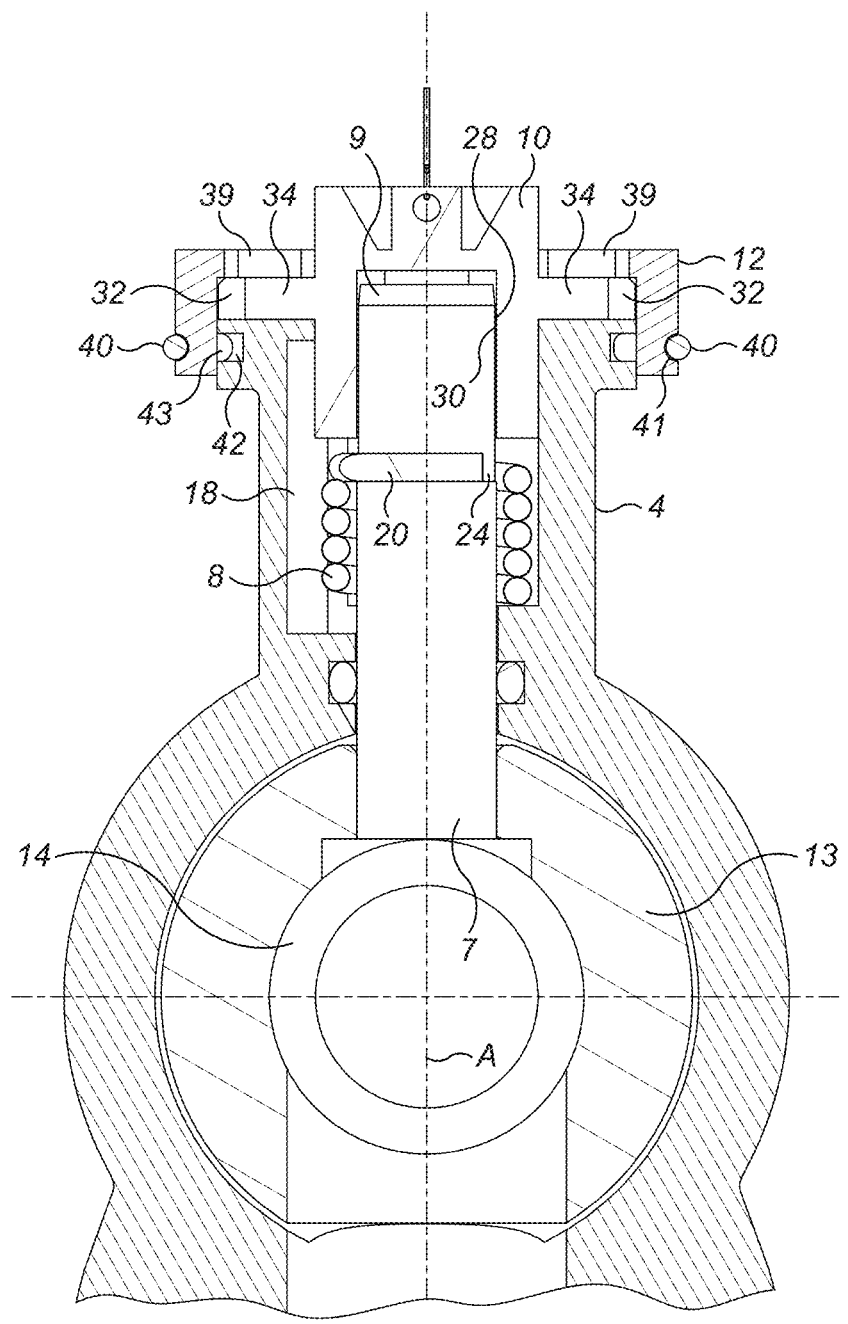
FIG. 2 shows a different cross-sectional view of the valve actuation mechanism of FIG. 1A in a non-actuating configuration.

With reference to FIGS. 1A to 4B, a valve actuation mechanism 2 comprises a housing 4, an actuation pin 6, a torque spring 8, a retaining element 10 and a locking element 12. The actuation pin 6 is mounted within the housing 4 so that it can rotate about an axis A to actuate a valve 13. In the depicted embodiment, the valve 13 is a ball valve 13, having a ball valve element 14. The ball valve 13 may be used in an evacuation system. The evacuation system may, for example, be provided on an aircraft. The housing 4 may have an inlet 15 for connection to a source 16 of inflating gas and an outlet 17 to the device to be inflated.

In this embodiment, the housing 4 comprises an elongate bore 18 through which the actuation pin 6 extends, with a first end 7 of the actuation pin 6 rotationally coupled at one end of the bore 18 to a ball valve element 14 for actuating the valve 13. A second end 9 of the actuation pin 6 is arranged proximate an opening 19 in the housing 4 at the other end of the bore 18 for interfacing with other components of the valve actuation mechanism 2, as will be described further below.

The actuation pin 6 is rotatably mounted in the housing 4 and rotatable under the force of the torque spring 8. The torque spring 8 is pre-loaded to bias the actuation pin 6 from a first position in which the valve 13 is not actuated, towards a second position in which the valve 13 is actuated. The retaining element 10 is mounted in the housing opening 19, and engages with the second end 9 of the actuation pin 6, and retains the actuation pin 6 in the first non-actuating position by preventing the actuation pin 6 from rotating under the tension of the pre-loaded torque spring 8, as will be described in further detail below.

Figure 5:
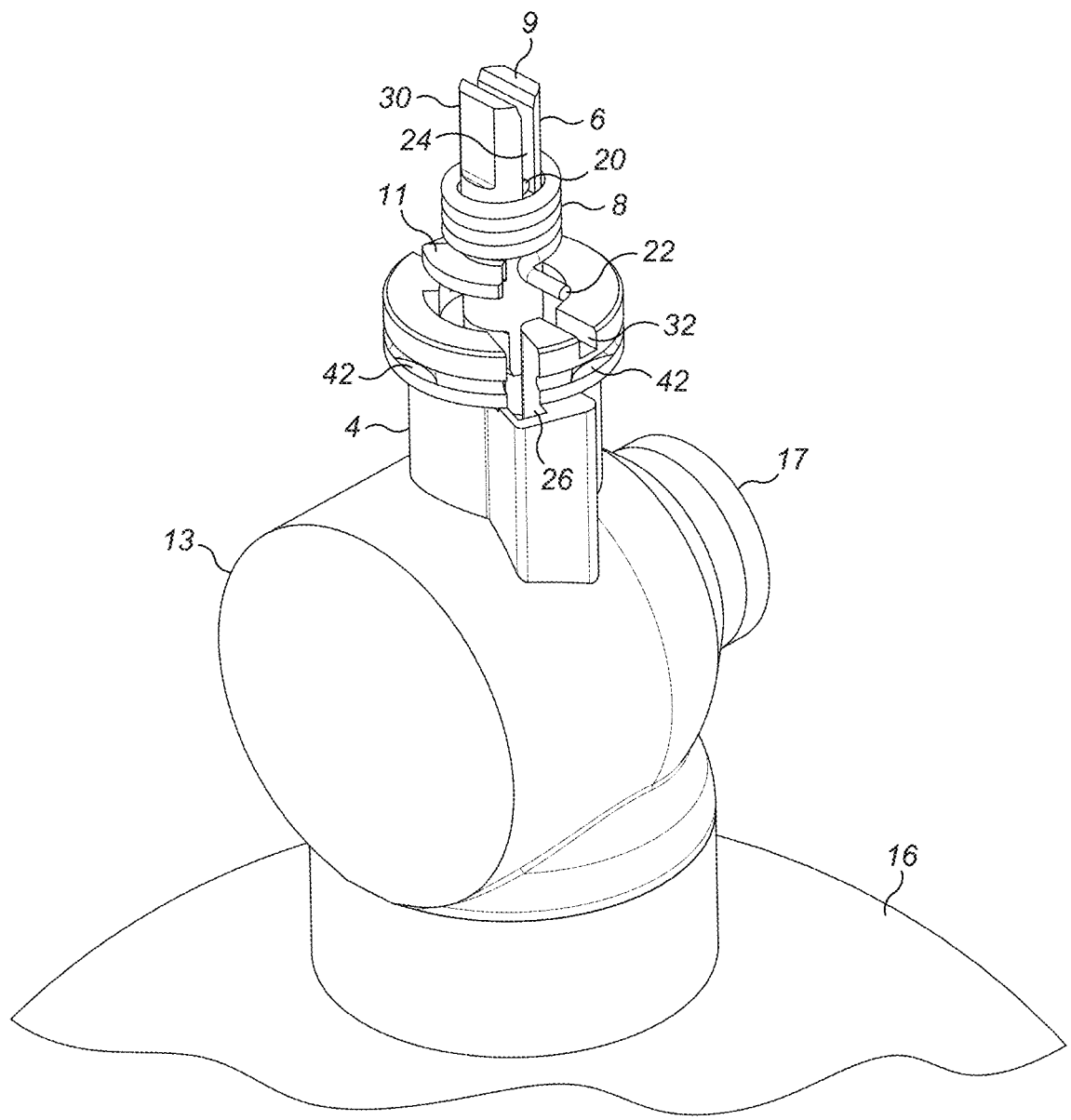
FIG. 5 shows a perspective view of the partly assembled valve actuation mechanism of FIG. 1A.
Figure 6:
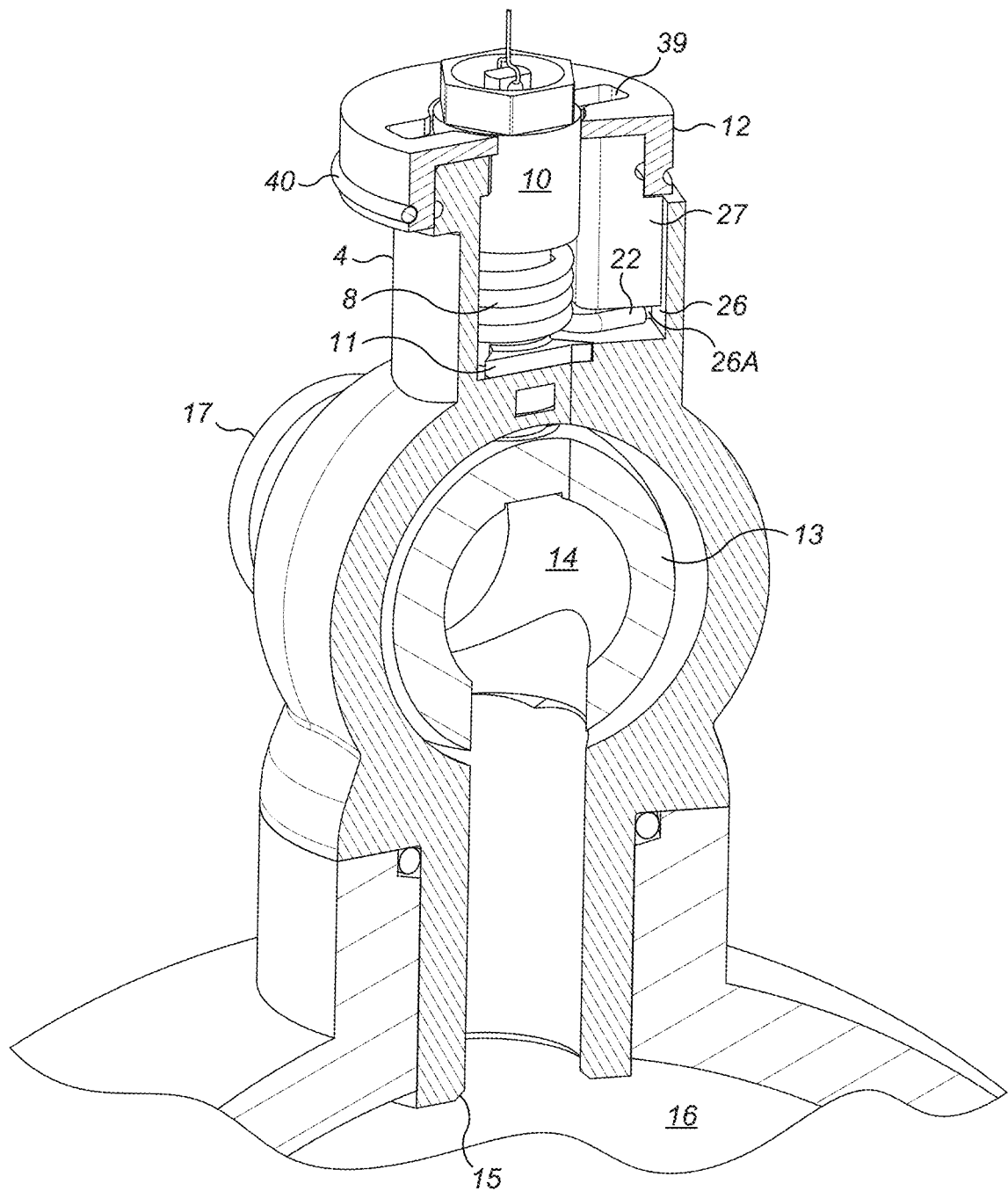
FIG. 6 shows a cross-sectional perspective view of the valve actuation mechanism of FIG. 1A.
Figure 7:
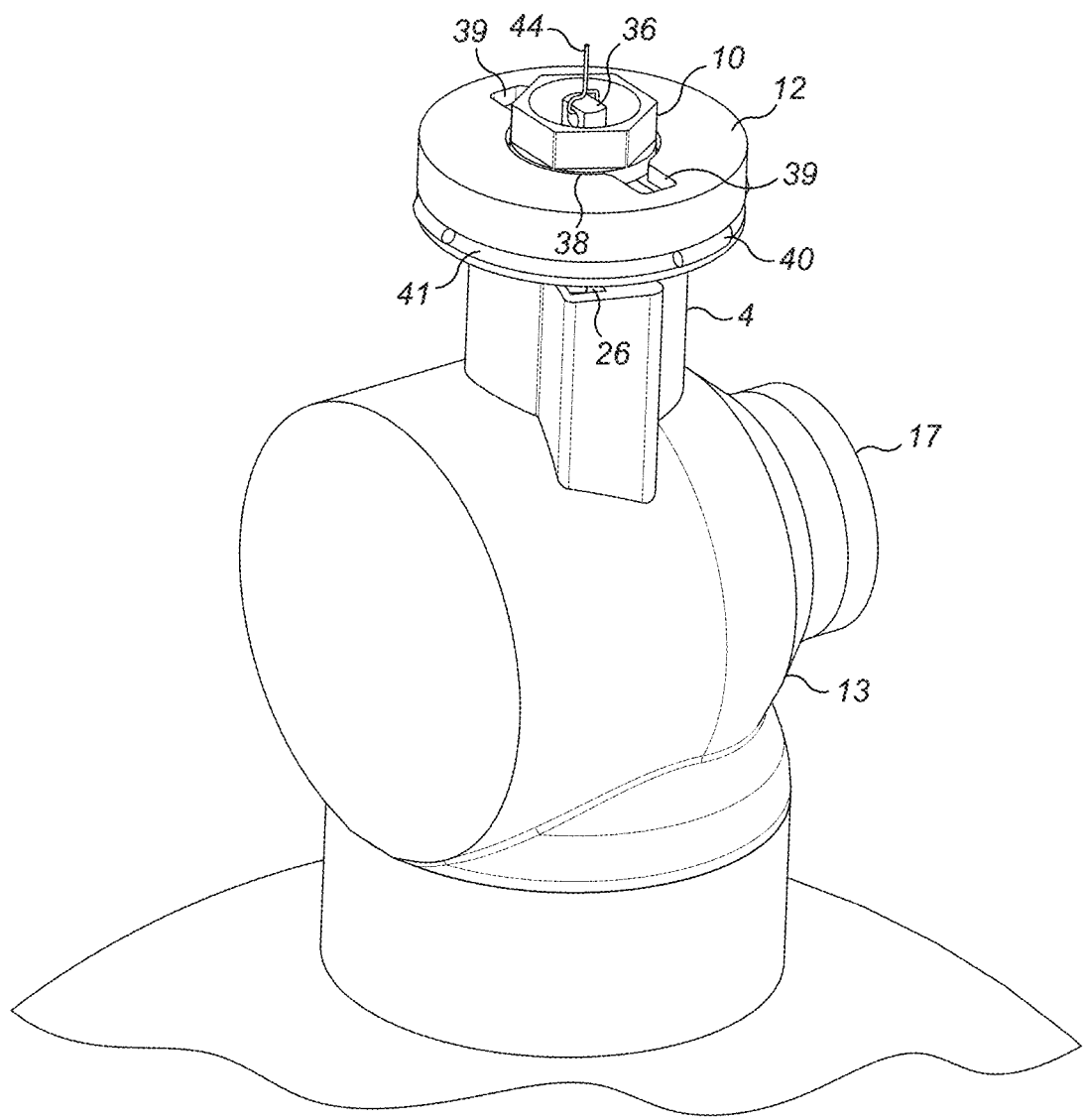
FIG. 7 shows a perspective view of the valve actuation mechanism of FIG. 1A.

With additional reference to FIGS. 5 and 6, the torque spring 8 comprises a first end 20 retained by the actuation pin 6 and a second end 22 retained by the housing 4. The first end 20 of the torque spring 8 is located within a slot 24 formed in the second end 9 of the actuation pin 6. Also with reference to FIGS. 13 and 14, the second end 22 of the torque spring 8 is received within a slot 26 formed in the side wall 27 of the housing 4. The slot 26 extends towards the valve end of the bore 18 from the opening 19 of the housing 4.

In an embodiment, the slot 24 in the actuation pin 6 is formed by a fork in the second end 9 of the actuation pin 6. In a further embodiment, the torque spring 8 is a coil spring. The torque spring 8 can therefore be mounted onto the actuation pin 6 by inserting the actuation pin 6 through its coils, with the first end 20 of the spring 8 extending radially inwardly inside the slot 24 of the forked end. The second end 22 of the coil spring 8 may extend radially outwardly in order to extend into the slot 26 in the side wall 27 of the housing 4.

Figure 13:
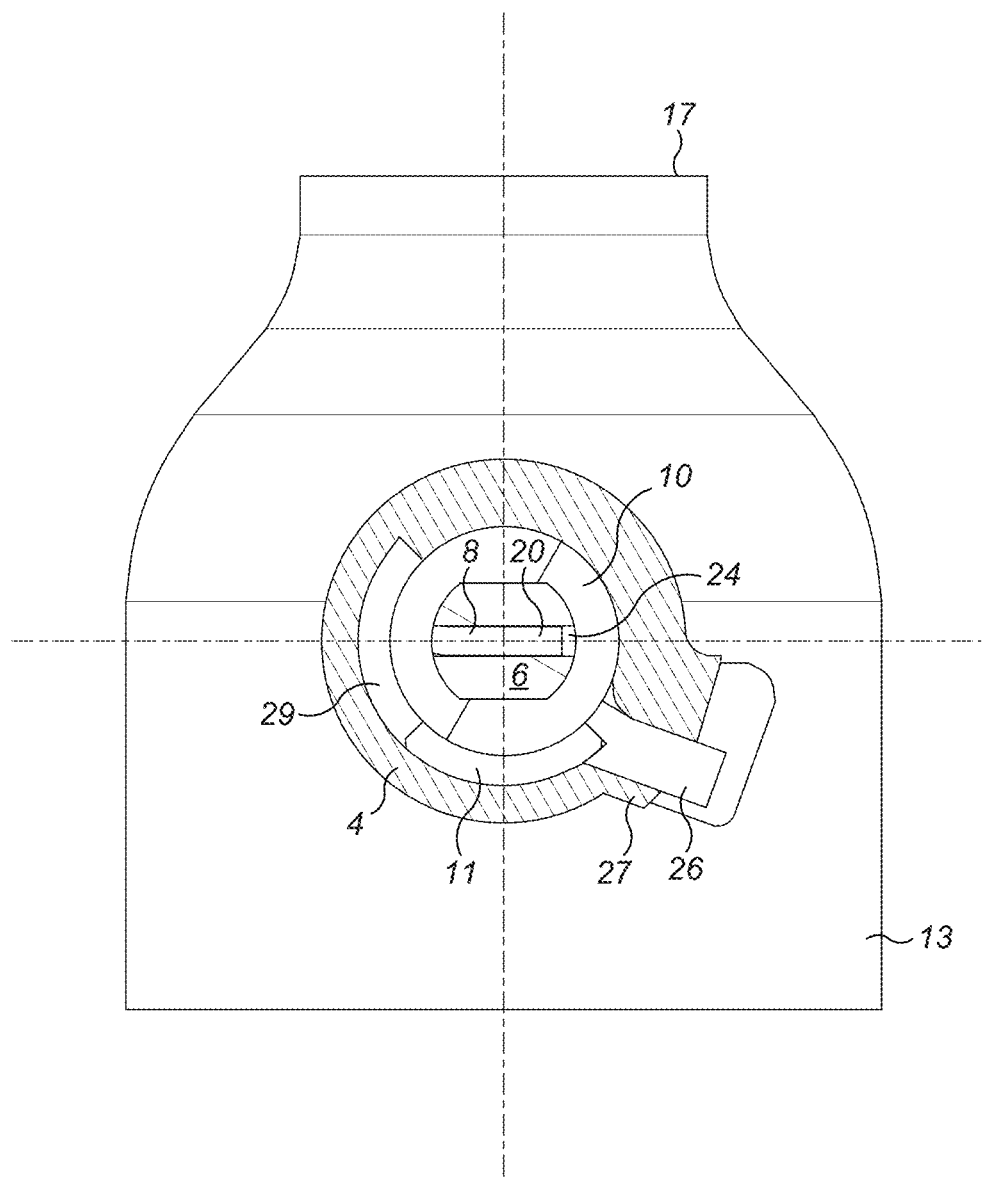
FIG. 13 shows a cross-sectional view along line B-B in FIG. 11.
Figure 14:
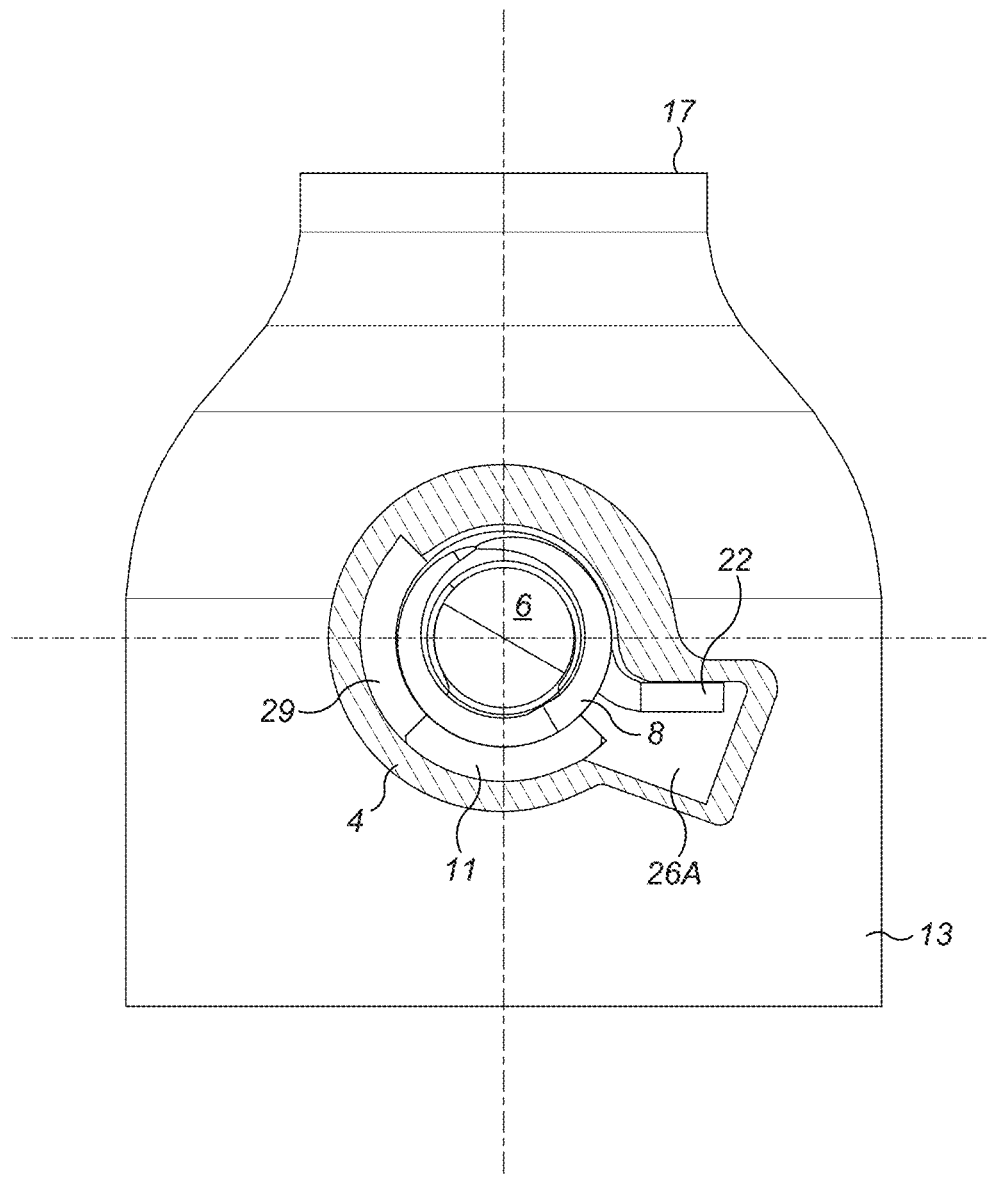
FIG. 14 shows a cross-sectional view along line C-C in FIG. 11.
Figure 15:
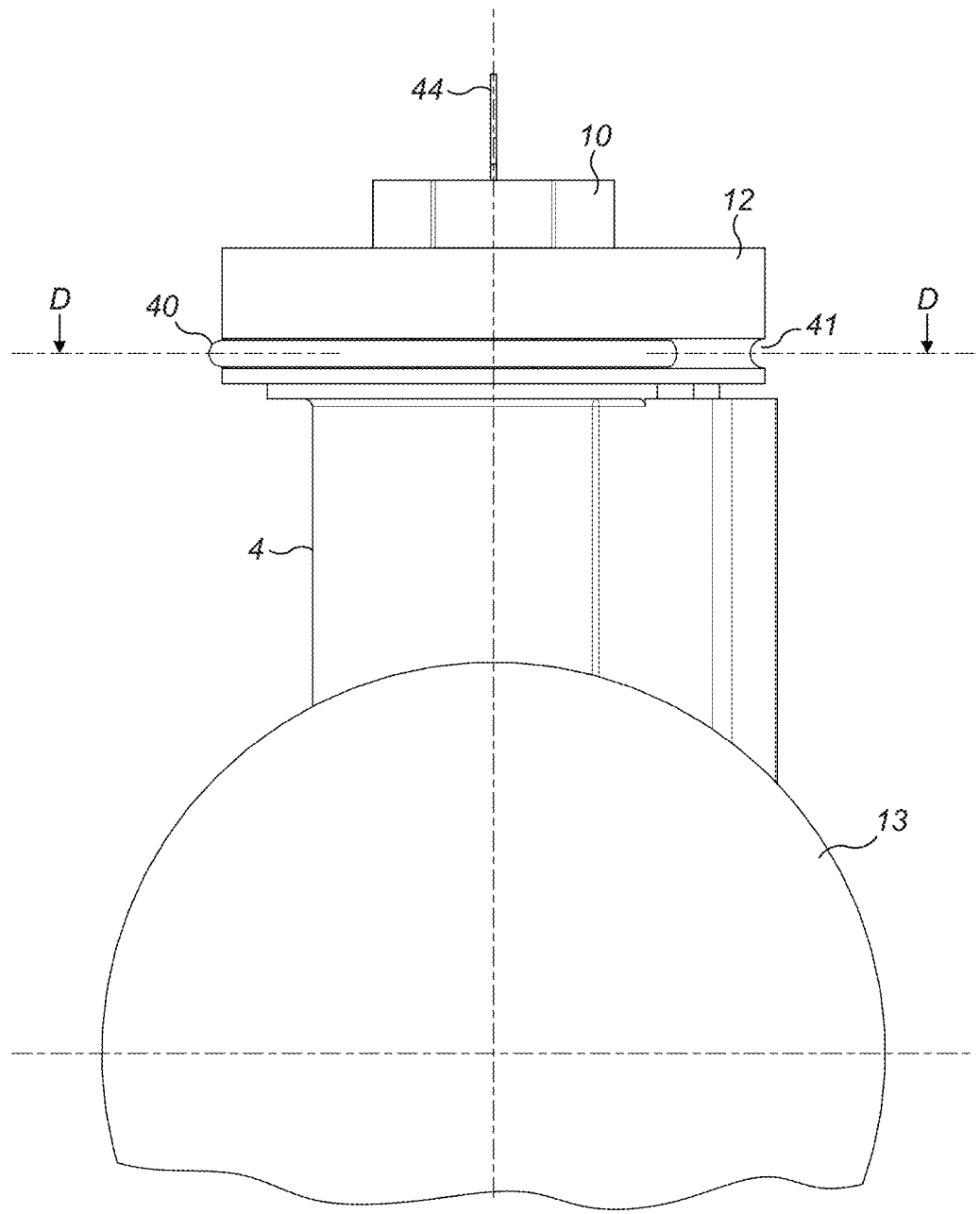
FIG. 15 shows a perspective view of the valve actuating mechanism of FIG. 1A in a release configuration.

The slot 26 facilitates the insertion of the torque spring 8 into the housing 4 by providing space for the protruding second end 22 as the torque spring 8 moves inside the housing 4. As shown in FIGS. 13 and 14, the slot 26 may be narrower near the opening 19 of the bore 18 and widen out near the level in the bore 18 at which the second end 22 of the torque spring 8 is to be retained to create a pocket 26A which receives the second end 22 of the torque spring 8 and prevents its vertical movement once installed.

With reference to FIGS. 4A to 6, in embodiments the actuation pin 6 comprises a protrusion 11 extending out of the side of the actuation pin 6 between its first end 7 and the torque spring 8. With additional reference to FIGS. 13 and 14, the bore 18 of the housing 4 is provided with a further slot 29 in its side wall 27 to receive the protrusion 11 when the actuation pin 6 is mounted within the housing 4. The slot 29 and the protrusion 11 may cooperate to restrict the rotation of the actuation pin 6 within the housing 4. For example, the actuation pin 6 may only be permitted to rotate through a maximum of about 90° within the housing 4, as demonstrated by the extent of the slot 29 in FIGS. 13 and 14. The slot 29 and protrusion 11 may be configured to provide any suitable maximum extent of rotation, for example between about 30° and 180°. The protrusion 11 may also act to limit the distance along the bore 18 to which the actuation pin 6 can be inserted.

In some embodiments, the retaining element 10 and actuation pin 6 each comprise corresponding key formations 28, 30 which interface so that the retaining element 10 and the actuation pin 6 rotate with each other.

In the embodiment shown in the figures, the second end 9 of the actuation pin 6 which interlocks with the retaining element 10 has a key formation 30 in the form of a rectangular outer cross-section and the retaining element 10 has a first key formation 28 in the form of a cavity 28 with a rectangular cross-section. The end of the actuation pin 6 is sized to snugly fit within the cavity 28 of the retaining element 10 so that the actuation pin 6 and the retaining element 10 rotate with each other.

The disclosure is not limited to rectangular cross-sections and other cross-sections may be used to interlock the retaining element 10 and actuation pin 6. Other suitable methods of engaging and retaining the actuation pin 6 with the retaining element 10 are also within the scope of this disclosure, for example the actuation pin 6 may comprise a cavity which receives the retaining element 10.

In order to prevent rotation of the retaining element 10, and thus rotation of the actuation pin 6, the housing 4 comprises a key formation 32 which interlocks with a second key formation 34 of the retaining element 10, as shown in FIGS. 4A, 4B, 8 and 9. In FIGS. 2 to 5, the edge of the housing 4 surrounding the opening 19 comprises two slots 32 which each receive an arm 34 of the retaining element 10. When the retaining element arms 34 are received within the slots 32, the walls of the slots 32 prevent rotation of the retaining element 10, and in turn of the actuation pin 6.

Figure 3:
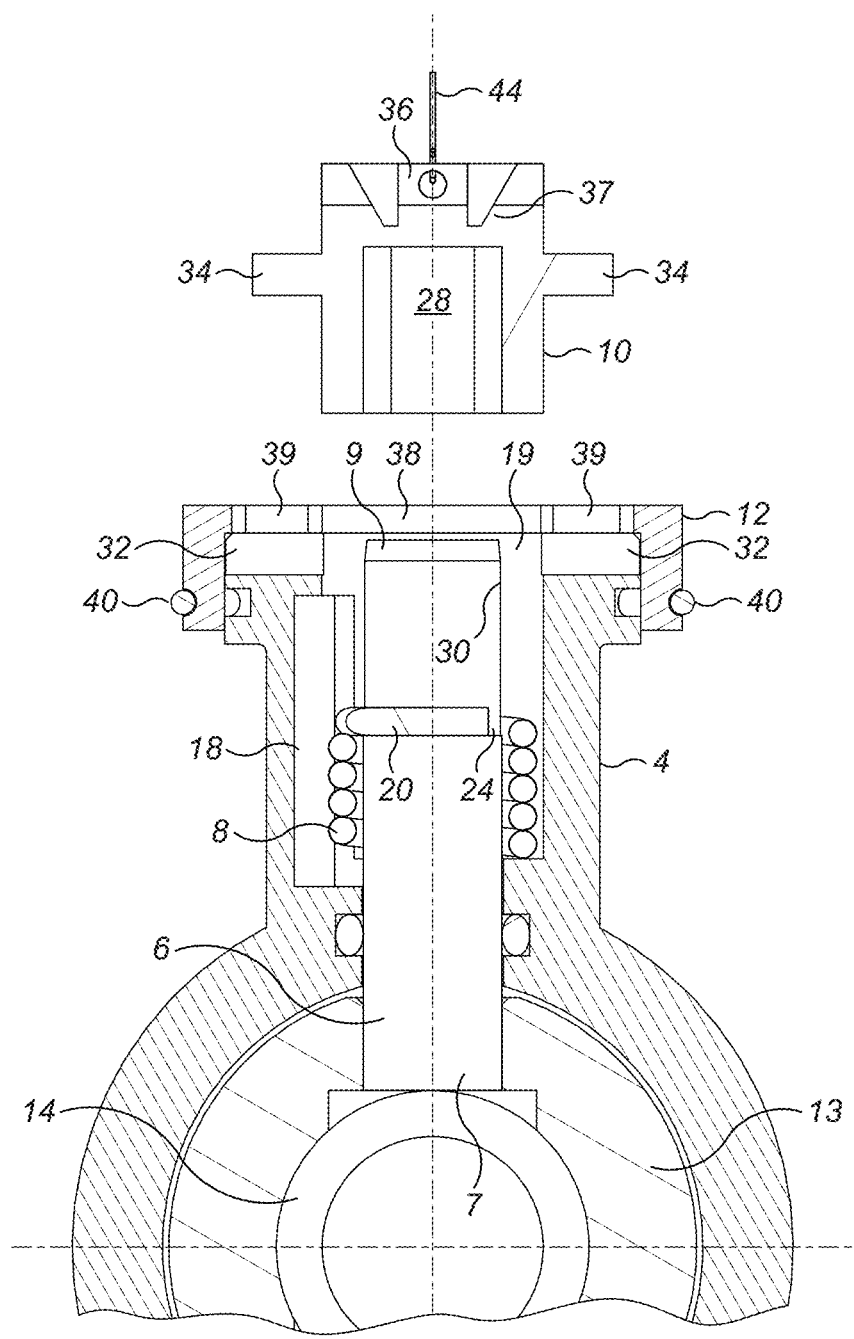
FIG. 3 shows a cross-sectional view of the valve actuation mechanism of FIG. 1A just after the valve actuation mechanism has been released.
Figure 4A:
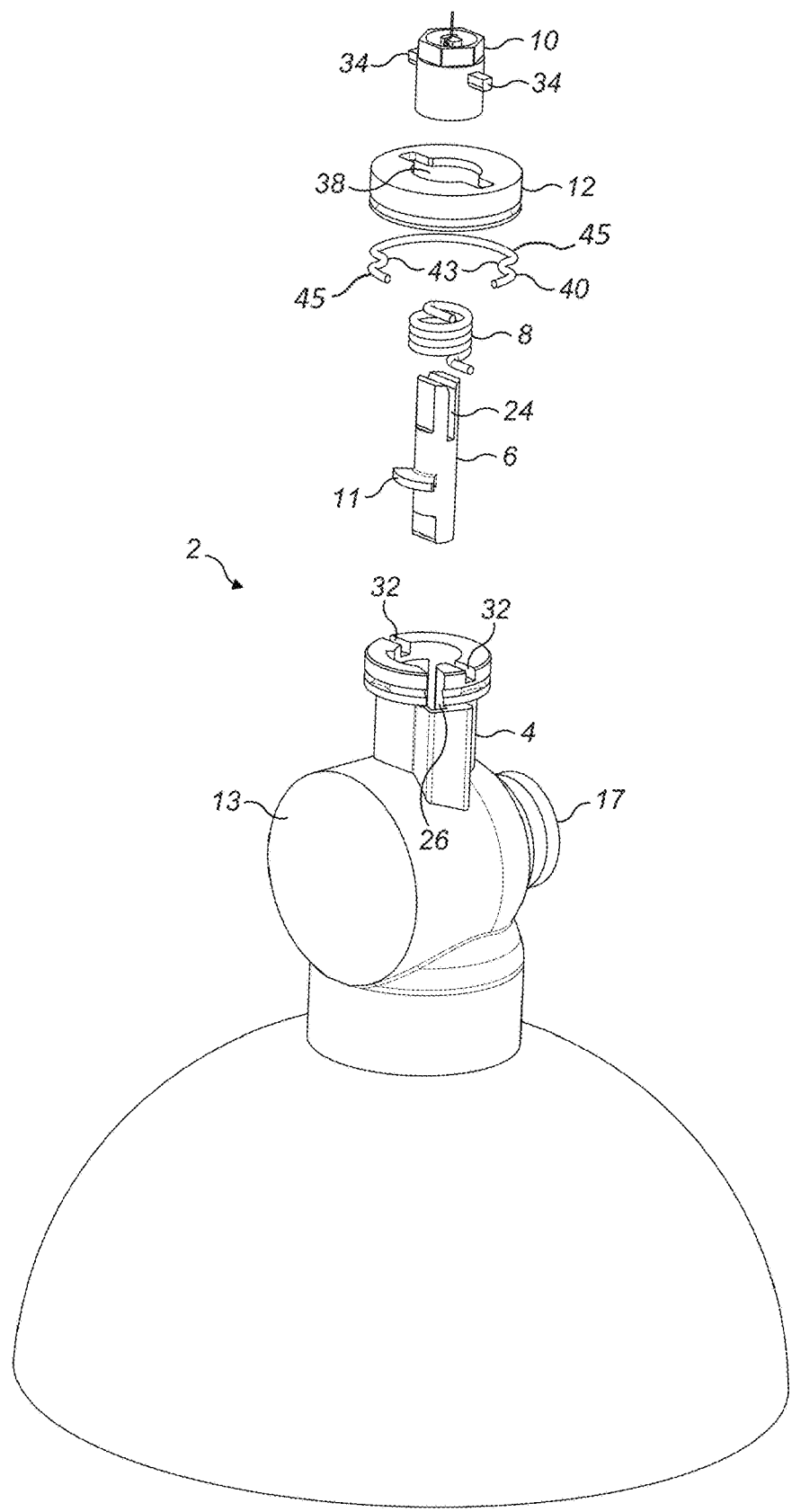
FIG. 4A shows an exploded view of the valve actuation mechanism of FIG. 1A.
Figure 4B:
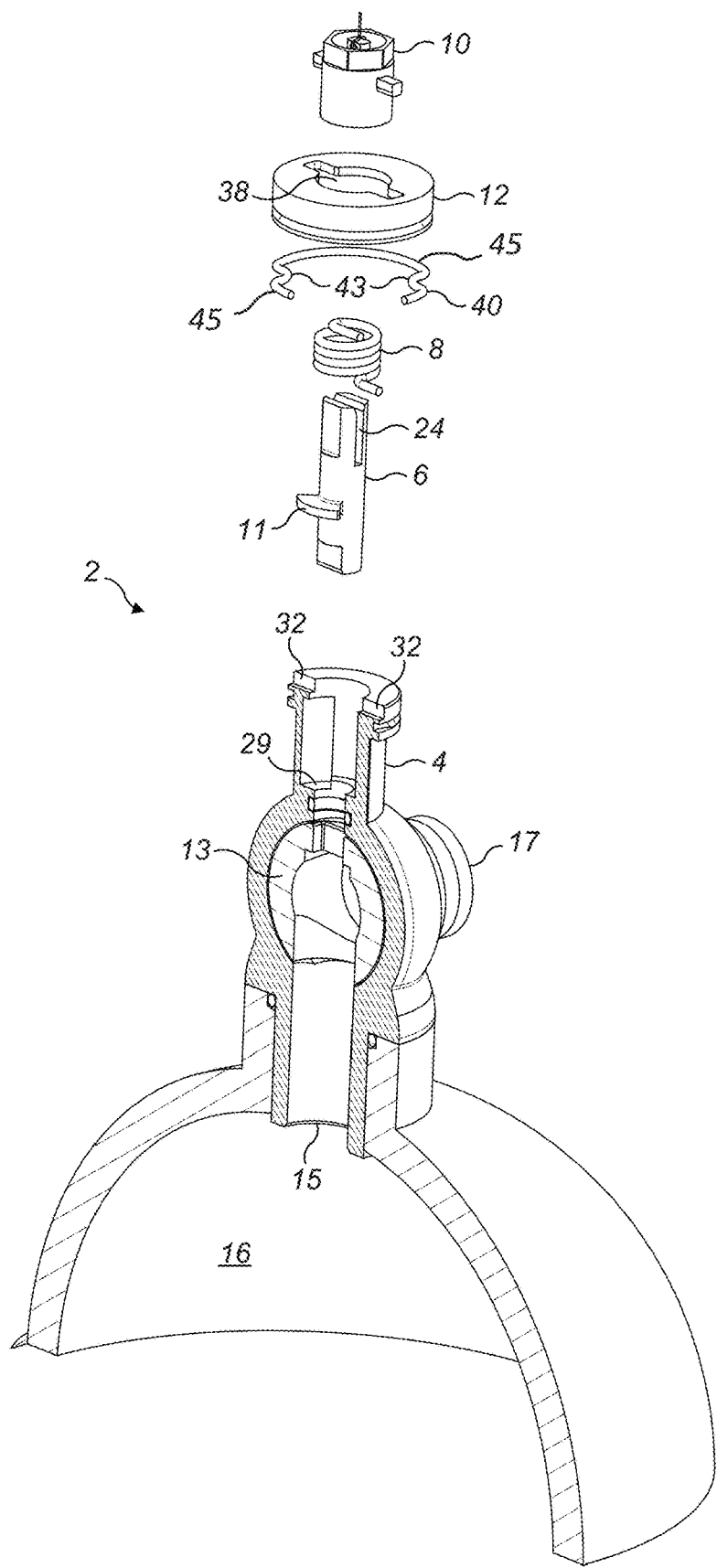
FIG. 4B shows a partly cross-sectional exploded view of the valve actuation mechanism of FIG. 1A.
Figure 8:
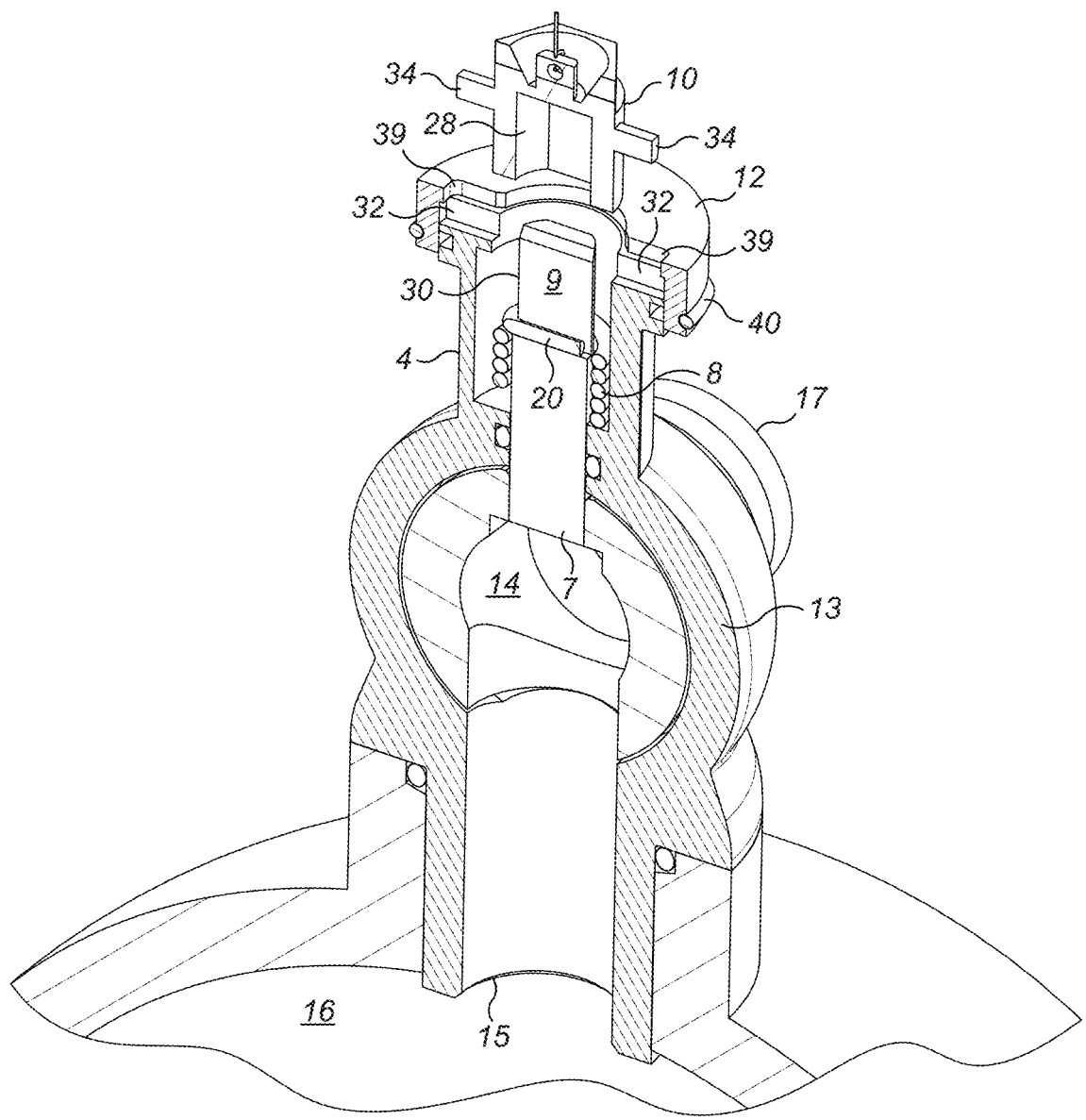
FIG. 8 shows a perspective cross-sectional view of the valve actuation mechanism of FIG. 1A just after the valve actuation mechanism has been released.
Figure 9:
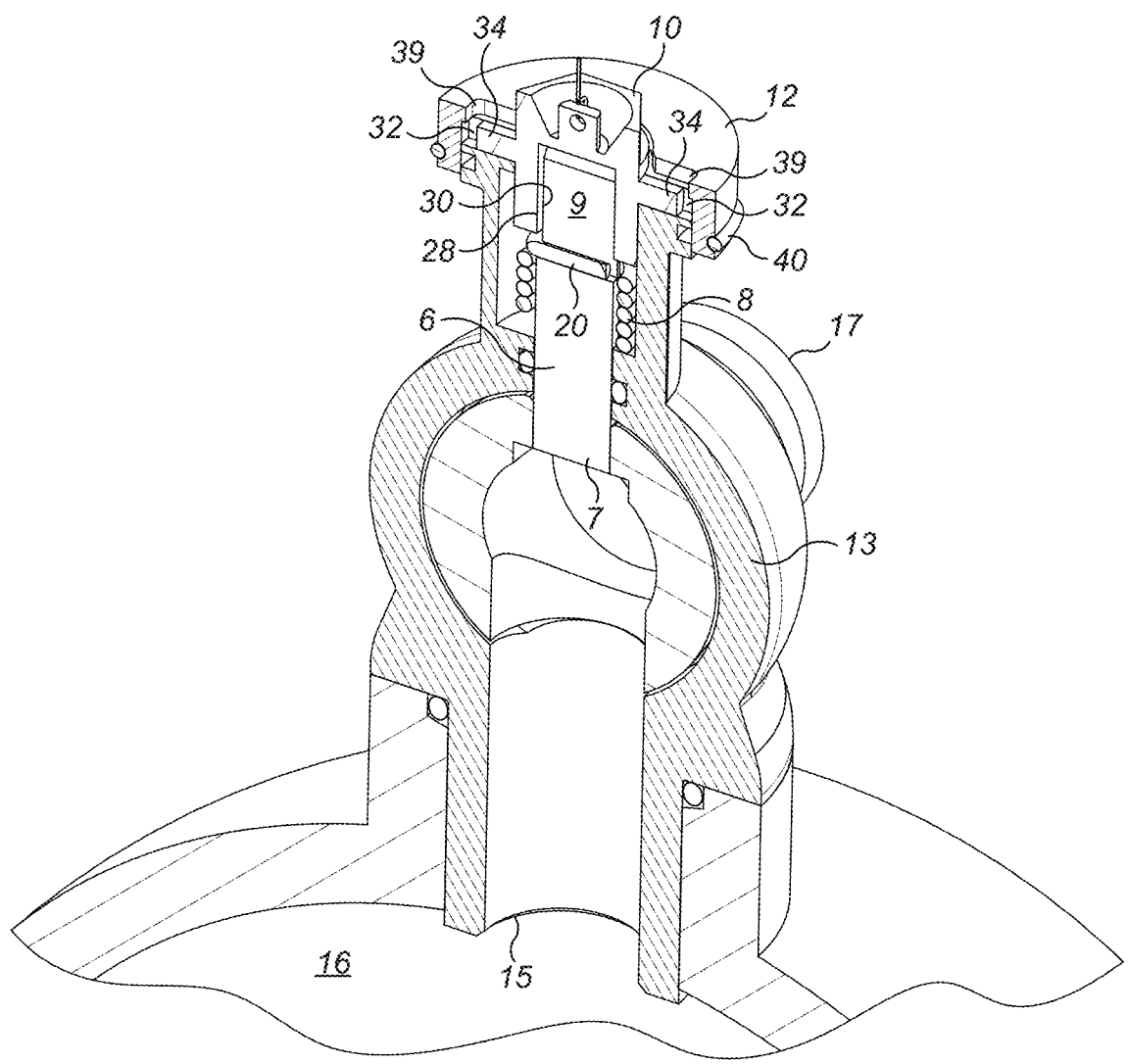
FIG. 9 shows a perspective cross-sectional view of the valve actuation mechanism of FIG. 1A in a non-actuating configuration.

As shown in FIGS. 3 and 8, the retaining element 10 can be pulled out of engagement with the actuation pin 6 and housing 4, for example via a connector 36 provided at the upper end 37 of the retaining element 10. The connector 36 on the retaining element 10 may be connected to an adjacent fixed surface via a strap or other similar element 44 to ensure that the retaining element 10 is not lost when it is removed from the valve actuation mechanism 2.

When the retaining element 10 is disengaged from the housing 4 such that the arms 34 are no longer within the housing slots 32, the retaining element 10, and thus the actuation pin 6, is no longer prevented from rotating. The torque of the pre-loaded torque spring 8 acts on the actuation pin 6 to rotate it towards the actuating position to actuate the valve 14.

With reference to FIGS. 1A to 16, the locking element 12 is provided to selectively prevent disengagement of the retaining element 10 from the housing 4. In an embodiment, the locking element 12 is a cap fitted over the opening 19 in the housing 4. The locking element 12 is rotatable between a locked position, shown in FIGS. 10 to 12, in which the locking element 12 prevents disengagement of the retaining element 10 from the housing 4, and a release position, shown in FIGS. 2, 3, 8, 9, 15 and 16, in which the retaining element 10 may be disengaged from the housing 4. The locking element 12 may remain coupled to the housing 4 in both the locked and release positions.

In embodiments, the locking element 12 comprises a key formation 38 which is alignable with the second key formation 34 of the retaining element 10, and thus also with the key formation 32 in the housing 4. When the key formation 38 of the locking element 12 is aligned with the second key formation 34 of the retaining element 10, the retaining element 10 may be disengaged from the housing 4. Alignment of the locking element key formation 32 and the retaining element second key formation 34 corresponds to the release position of the locking element 12, shown in FIGS. 2, 3, 8, 9, 15 and 16. When the key formation 38 of the locking element 12 is misaligned with the second key formation 34 of the retaining element 10, the retaining element 10 may not be disengaged from the housing 4. Misalignment of the locking element key formation 38 and the retaining element second key formation 34 corresponds to the locked position of the locking element 12, shown in FIG. 10.

In the embodiment shown in FIGS. 4A, 4B and 6 to 10, the key formation 38 of the locking element 12 comprises a slot or aperture 38 in the locking element 12 that is shaped correspondingly to the central body and arms 34 of the retaining element 10. Due to their corresponding shapes, the arms 34 of the retaining element 10 can pass through the locking element 12 only when correctly aligned with the side portions 39 of the slot 38.

The locking element 12 fits on the edge of the opening 19 in the housing 4 so that the arms 34 of the retaining element 10 pass through the slot 38 in the locking element 12 before being received within the slots of the housing 4. The depth of the arms 34 is no greater than the depth of the slots 32 of the housing 4 so that the locking element 12 can rotate over the arms 34 in the slots 32 to misalign the key formations 32, 34, 38 of the housing 4, retaining element 10 and locking element 12. In the misaligned, locked position of the locking element 12, the retaining element 10 cannot be disengaged from the housing 4, as demonstrated in FIG. 10.

In embodiments, the locking element 12 comprises a securing element 40 to retain it in the locked and/or release positions. The securing element 40 may comprise a resilient member which is deformable to allow the locking element 12 to rotate between the locked and release positions. In one embodiment, the housing 4 comprises a detent 42 and the securing element 40 comprises a resilient member or arm 45 which is engageable with the detent 42 to retain the locking element 12 in a desired position.

Figure 12:
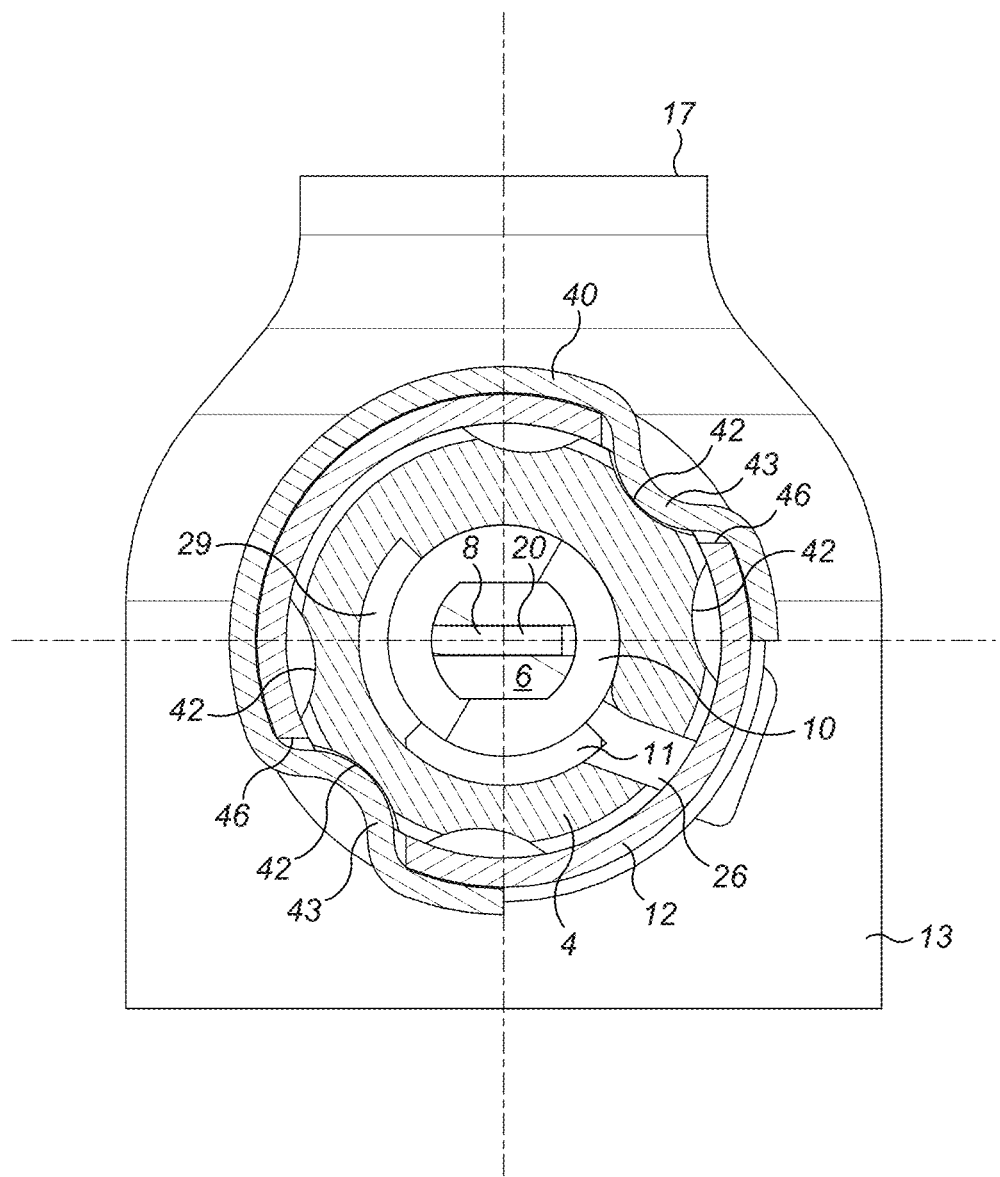
FIG. 12 shows a cross-sectional view along line A-A in FIG. 11.
Figure 16:
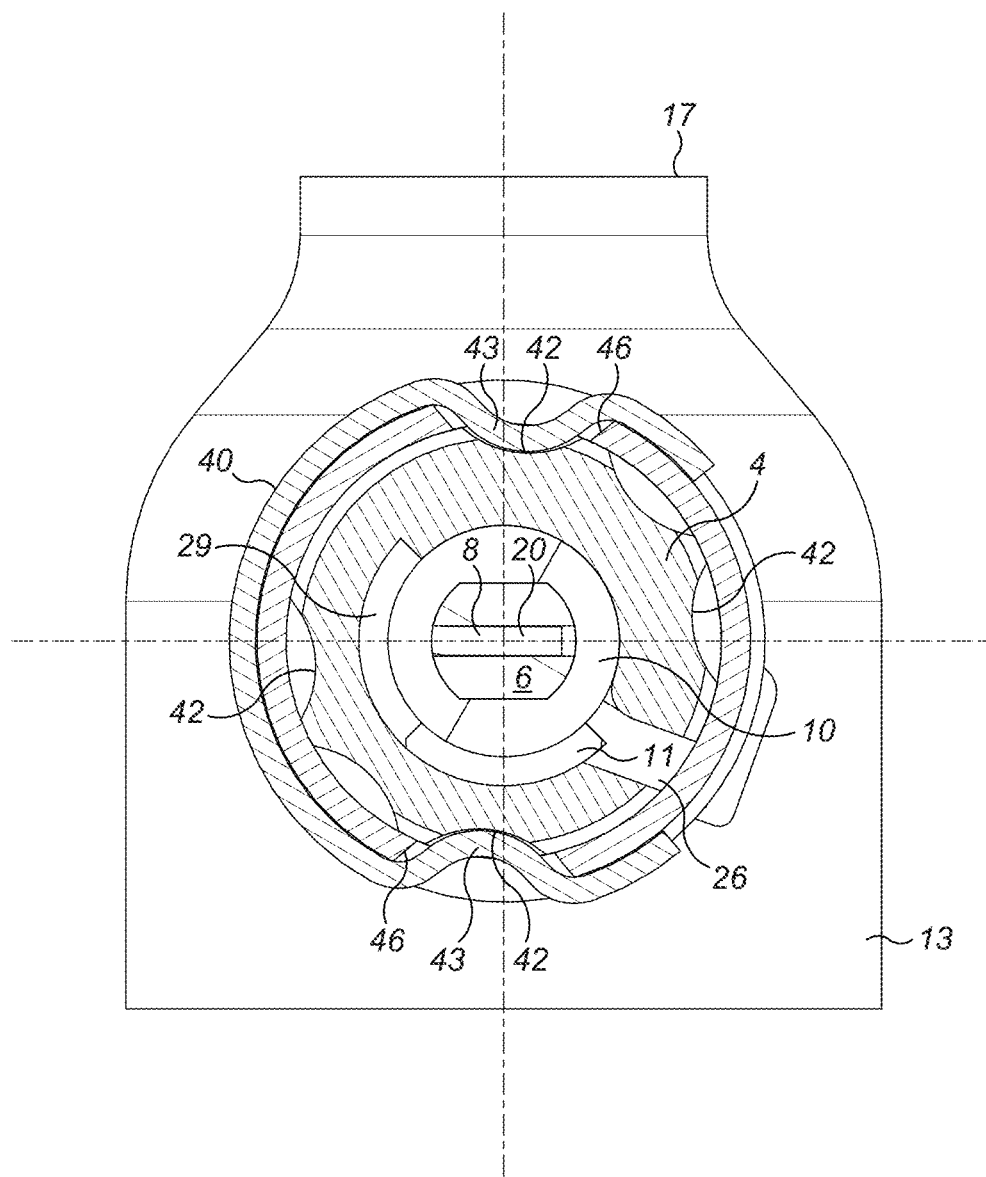
FIG. 16 shows a cross-sectional view along line D-D in FIG. 15.

Referring to FIGS. 12 and 16, the housing 4 comprises at least one pair, in this case three pairs, of opposing detents 42. The resilient securing element 40 comprises a wire or band shaped to extend over halfway around the housing 4 and locking element 12. The resilient securing element 40 is located in a peripheral groove 41 formed in the locking element 12. The groove 41 comprises a pair of opposed openings 46 in a peripheral wall of the locking element 12 to permit locking portions 43 of the securing element 40 to extend through the locking element 12 into engagement with a respective pair of detents 42 in the housing 4. Rotating the locking element 12 around the housing 4 against the retaining force exerted by the securing element 40 will cause the resilient securing element 40 to deform and thereby disengage from one pair of detents 42. Continued rotation of the locking element 12 will bring the locking portions 43 of the securing element 40 into alignment with the adjacent pair of detents 42, allowing them to engage with the detents 42, and so retain the locking element 12 in that rotational position.

In other examples, the securing element 40 may comprise a removable element that may or may not be resilient. The element can simply be removed from the valve actuation mechanism 2 in order to permit rotation of the locking element 12 from its locking position to its unlocking position.

In use, the valve actuation mechanism 2 is assembled and fitted to a valve 14 with the torque spring 8 pre-loaded to bias the actuation pin 6 in the first position for non-actuation of the valve 14. The retaining element 10 is engaged with the actuation pin 6 and the housing 4 and the locking element 12 is in the locked position. To actuate the valve 14, the locking element 12 is rotated into the release position (FIGS. 2 and 9) and the retaining element 10 is disengaged from the housing 4, for example by pulling on the connector 36 (FIGS. 3 and 8).

Once the arms 34 of the retaining element 10 are clear of the slots 32 in the housing 4 and the slot 38 in the locking element 12, the retaining element 10, and thus the actuation pin is free to rotate under the force of the torque spring 8. The actuation pin 6 may be rotated whilst the retaining element 10 is still partly engaged with the second end 9 of the actuation pin 6, provided the arms 34 of the retaining element 10 are not blocked by the housing 4 or locking element 12.

Figure 10:
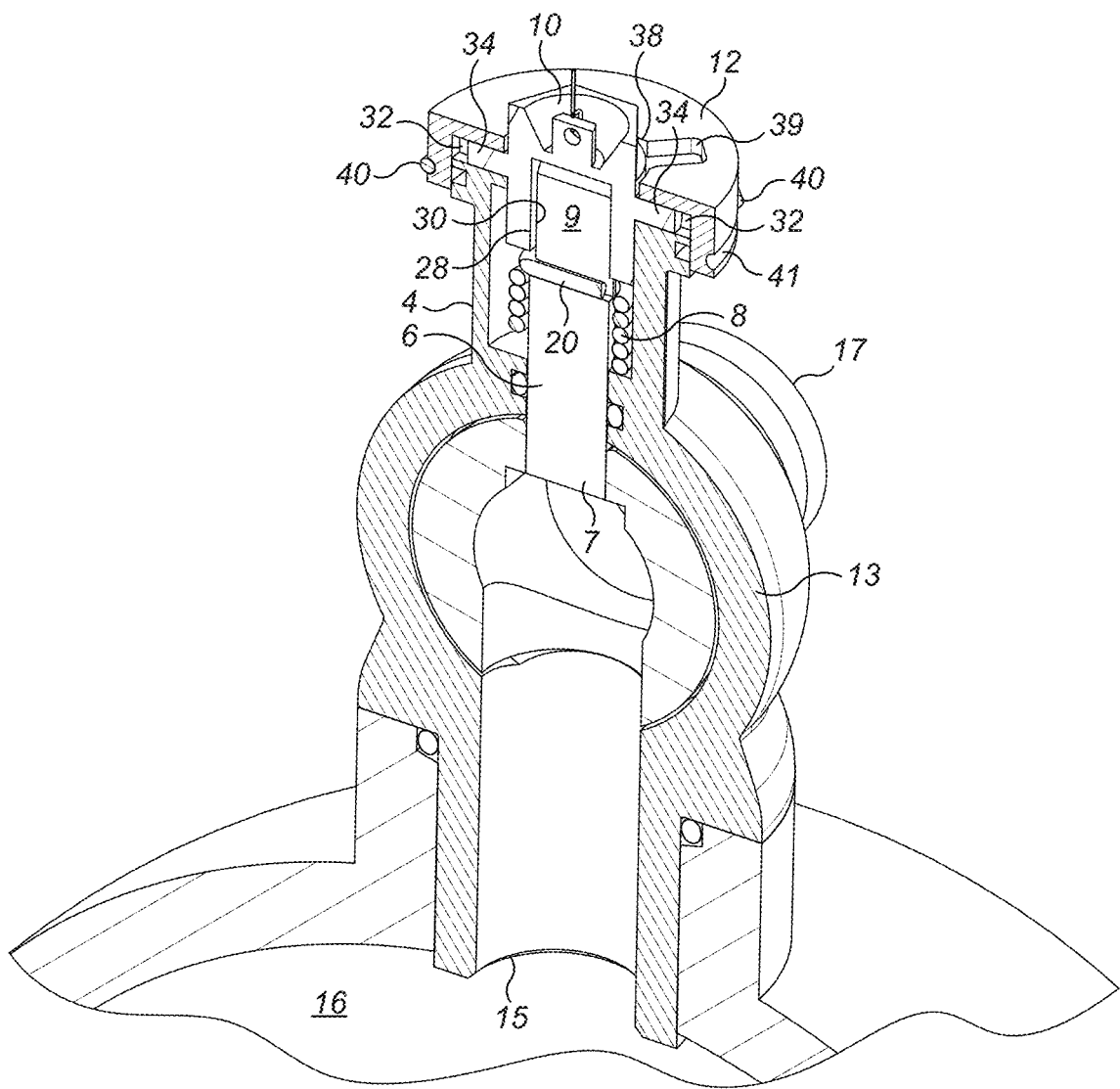
FIG. 10 shows a perspective cross-sectional view of the valve actuation mechanism of FIG. 1A in a locked configuration.
Figure 11:
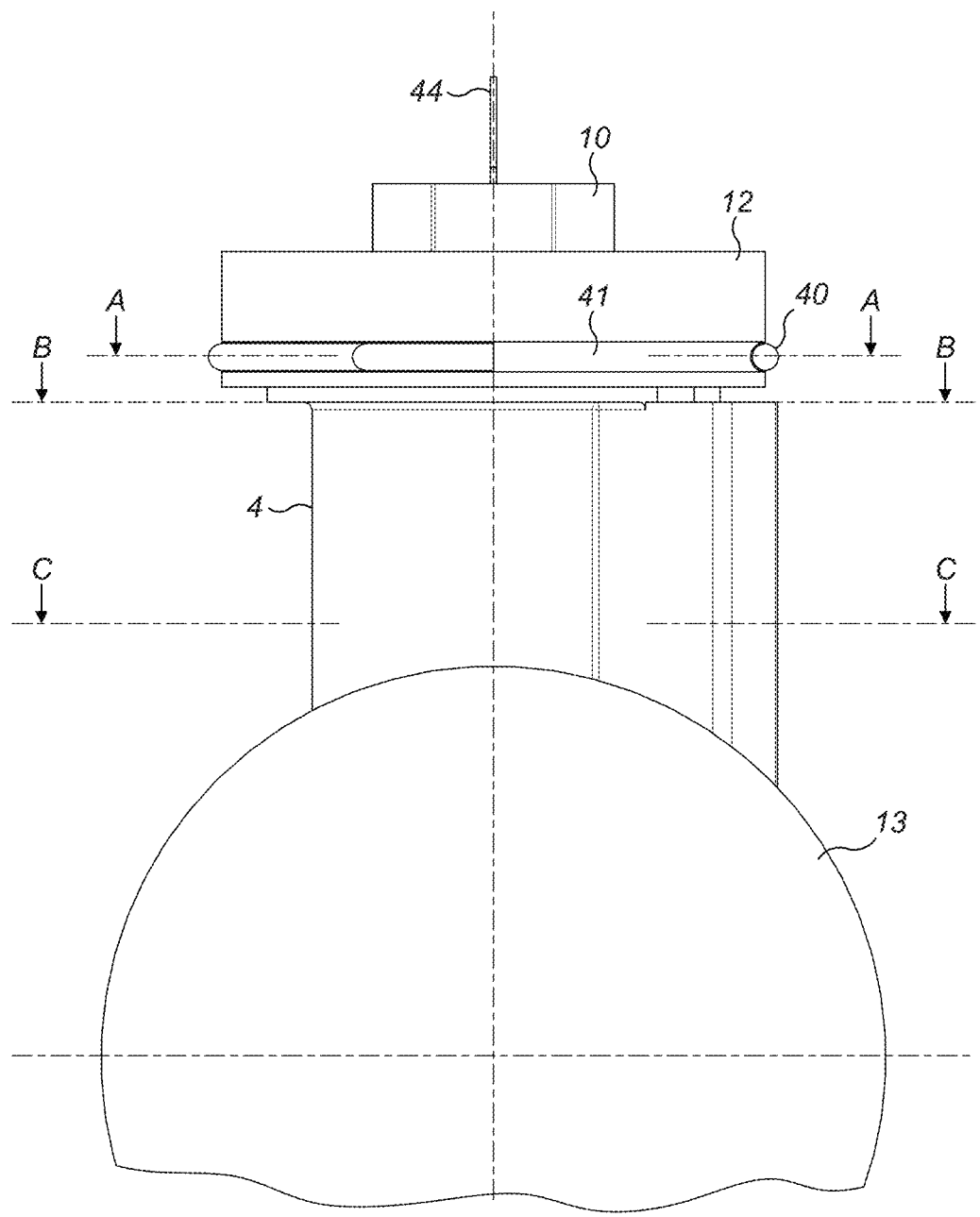
FIG. 11 shows a perspective view of the valve actuating mechanism of FIG. 1A in a locked configuration.

To reset the valve actuation mechanism 2 after the valve 14 has been actuated, the actuation pin 6, which has been rotated into the second actuating position by the torque spring 8, is engaged by the retaining element 10. Keeping the arms 34 of the retaining element 10 free of the locking element 12 and housing 4, the retaining element 10 is rotated in order to rotate the actuation pin 6 from the second actuating position into the first non-actuating position, against the bias of the torque spring 8. This loads the torque spring 8 for a subsequent actuating action. Once the actuation pin 6 has been rotated to the first position, and with the locking element 12 in the release position, the retaining element 10 can be inserted into the housing 4, through the slot 38 in the locking element 12, so that the arms 34 are fully seated within the housing 4 slots. The locking element 12 is then rotated into the locked position to prevent disengagement of the retaining element 10 from the actuation pin 6 and housing 4 (FIG. 10).

An example of the initial assembly of the valve actuation mechanism 2 will now be described with reference to the embodiments shown in the figures. The torque spring 8 as a coil spring 8 is coupled to the actuation pin 6, with its coils wrapped around the actuation pin 6, its first end 20 received within a slot 24 formed by the forked end 9 of the actuation pin 6, and its second end 22 protruding radially outward from the coil. The actuation pin 6 and torque spring 8 are inserted into the housing 4 through the opening 19, the housing 4 providing a slot 26 for receiving and retaining the protruding second end 22 of the torque spring 8 and, optionally, a slot 29 for receiving and retaining the protrusion 11 of the actuation pin 6.

The locking element 12 is coupled to the opening 19 of the housing 4 and the securing element 40 is attached to the locking element 12 and housing 4 to retain the locking element 12 in the release position by engaging with the appropriate detents 42. The second end 9 of the actuation pin 6 is engaged and rotated by the retaining element 10 to pre-load the torque spring 8. The retaining element 10 is then inserted into the housing 4 through the slot 38 in the locking element 12 to fully seat its arms 34 within the slots 32 in the open edge of the housing 4. The locking element 12 is then rotated into the locked position to prevent disengagement of the retaining element 10 from the actuation pin 6 and housing 4.

Alternatively, the second end 9 of the actuation pin 6 is engaged and rotated by the retaining element 10 to pre-load the torque spring 8 and the retaining element 10 is fully seated in the housing 4 with its arms 34 in the slots 32 before the locking element 12 is coupled to the housing 4. The locking element 12 mounted in the locked position to prevent disengagement of the retaining element 10 from the actuation pin 6 and housing 4.

It will be appreciated that the above description is of a non-limiting embodiment only and that various modifications may be made thereto without departing from the scope of the disclosure.

The invention claimed is:

1. A valve comprising;
 a valve actuation mechanism, the valve actuation mechanism comprising:
  a housing;
  an actuation pin rotatably mounted within the housing;
  at least one torque spring coupling the actuation pin to the housing for biasing the actuation pin from a first, inoperative rotational position towards a second, operative rotational position;
  an actuation pin retaining element for selectively retaining the actuation pin in its first position, the retaining element being engageable with the actuation pin and the housing when the retaining element is in a retaining position so as to prevent rotation of the actuation pin towards its second position, and selectively disengageable from the actuation pin and the housing to permit rotation of the actuation pin towards its second position; and
  a locking element for selectively preventing disengagement of the retaining element from the housing,
  the first position of the actuation pin corresponding to a closed state of the valve and the second position of the actuation pin corresponding to an open state of the valve.
2. The valve of claim 1, wherein the housing comprises a housing key formation for receiving a corresponding retaining element key formation on the retaining element when the retaining element is in its retaining position.
3. The valve of claim 2, wherein the locking element comprises a locking element key formation selectively alignable with the housing key formation and the retaining element key formation to permit the retaining element to disengage from the housing.
4. The valve of claim 3, wherein the housing key formation and locking element key formation each comprise at least one slot.
5. The valve of claim 3, wherein the locking element key formation comprises an opening through which the retaining element can pass when the locking element key formation and retaining element key formation are aligned.
6. The valve of claim 3, wherein the retaining element comprises a further key formation for receiving an end of the actuation pin when the retaining element is in its retaining position.
7. The valve of claim 5, wherein the locking element comprises a securing element configured to retain the locking element in at least one of a locked position and a release position, in which the release position allows the retaining element to disengage from the housing.
8. The valve of claim 7, wherein the securing element comprises a resilient member deformable to allow the locking element to rotate between the locked position and the release position.
9. The valve of claim 7, wherein the securing element comprises at least one resilient arm which engages a detent in the housing to retain the locking element in at least one of the locked and release positions.
10. The valve of claim 1, wherein the locking element comprises a securing element configured to retain the locking element in at least one of a locked position and a release position, in which the release position allows the retaining element to disengage from the housing.
11. The valve of claim 10, wherein the securing element comprises a resilient member deformable to allow the locking element to rotate between the locked position and the release position.
12. The valve of claim 10, wherein the securing element comprises at least one resilient arm which engages a detent in the housing to retain the locking element in at least one of the locked and release positions.
13. The valve of claim 10, wherein the securing element is received within a groove formed within a peripheral wall of the locking element.
14. The valve of claim 13, wherein the groove comprises openings therein to allow engagement of a resilient arm of the securing element with a detent in the housing.
15. The valve of claim 1, wherein the actuation pin comprises a slot to accommodate a first end of the torque spring.
16. The valve of claim 1, wherein the housing comprises a slot to accommodate a second end of the torque spring.
17. The valve of claim 1, wherein the retaining element comprises a key formation for receiving an end of the actuation pin when the retaining element is in its retaining position.
18. A method of assembling an of a valve, the method comprising:
 coupling a torque spring to an actuation pin by inserting a first end of the torque spring into a slot in the actuation pin;
 mounting the actuation pin and torque spring within a housing, wherein a second end of the torque spring extends into a slot within the wall of the housing;
 coupling a locking element to the housing;
 engaging a retaining element with the actuation pin and rotating the retaining element so that the actuation pin rotates to load the torque spring;

engaging the retaining element with the housing so that the housing prevents the retaining element and actuation pin from rotating under the load of the torque spring;

locking the locking element to prevent disengagement of the retaining element from the actuation pin and the housing; and coupling the actuation mechanism to the valve, the first position of the actuation pin corresponding to a closed state of the valve and the second position of the actuation pin corresponding to an open state of the valve.

19. The method of claim 18, wherein locking the locking element comprises moving a key formation of the locking element out of alignment with a corresponding key formation of the retaining element.

20. A valve actuation mechanism comprising:

a housing;

an actuation pin rotatably mounted within the housing;

at least one torque spring coupling the actuation pin to the housing for biasing the actuation pin from a first, inoperative rotational position towards a second, operative rotational position;

an actuation pin retaining element for selectively retaining the actuation pin in its first position, the retaining element being engageable with the actuation pin and the housing when the retaining element is in a retaining position so as to prevent rotation of the actuation pin towards its second position, and selectively disengageable from the housing to permit rotation of the actuation pin towards its second position; and a locking element for selectively preventing disengagement of the retaining element from the housing, wherein the housing comprises a housing key formation for receiving a corresponding retaining element key formation on the retaining element when the retaining element is in its retaining position, wherein the locking element comprises a locking element key formation selectively alignable with the housing key formation and the retaining element key formation to permit the retaining element to disengage from the housing, wherein the locking element key formation comprises an opening through which the retaining element can pass when the locking element key formation and retaining element key formation are aligned, wherein the locking element comprises a securing element configured to retain the locking element in at least one of a locked position and a release position, in which the release position allows the retaining element to disengage from the housing.

* * * * *